United States Patent [19]

Sablich et al.

[11] 4,179,373
[45] Dec. 18, 1979

[54] SHUTOFF AND BYPASS VALVE

[75] Inventors: Milan Sablich, Bloomfield Hills; Eugene J. Bedard, Detroit, both of Mich.

[73] Assignee: Consolidated Foods Corporation, Old Greenwich, Conn.

[21] Appl. No.: 942,242

[22] Filed: Sep. 14, 1978

[51] Int. Cl.² .............................................. B01D 35/00
[52] U.S. Cl. .............................. 210/98; 137/624.11; 210/100
[58] Field of Search .......................... 210/97, 87–89, 210/98, 100, 101, 106, 130, 132, 138, 143; 137/624.11, 624.12

[56] References Cited

U.S. PATENT DOCUMENTS

| | | | |
|---|---|---|---|
| 3,048,274 | 8/1962 | Lundeen | 210/101 |
| 3,473,695 | 10/1969 | Anesi | 137/624.11 |
| 3,485,368 | 12/1969 | Beath | 210/100 |
| 3,509,998 | 5/1970 | Pellett et al. | 210/98 |

Primary Examiner—John Adee
Attorney, Agent, or Firm—William S. Henry

[57] ABSTRACT

An apparatus for use in a liquid supply system having an inline liquid processor or purifier and which supplies liquid continuously or intermittently to an appliance or other point of use. The apparatus includes a valve structure which normally directs the flow of liquid through a pipe connected to the processor or purifier where impurities are removed before the liquid flows to the appliance and, when a predetermined quantity of liquid has passed through the valve structure, the flow of liquid to the processor is interrupted and the liquid is directed through a bypass pipe which is connected directly to the appliance.

6 Claims, 4 Drawing Figures

SHUTOFF AND BYPASS VALVE

SUMMARY OF THE INVENTION

The present invention relates generally to valve structures of various kinds and is embodied particularly in a shutoff and bypass valve which permits a predetermined quantity of liquid to flow along a first path and then automatically interrupts the flow and directs the liquid along a second path. The valve structure includes a body having an inlet port and first and second outlet ports. A plunger within the valve body normally is maintained in a first position by a timing or metering mechanism to close the second outlet port and permit liquid to flow from the first outlet port until the plunger is released and thereafter the plunger is automatically shifted to a second position to close the first outlet port and permit liquid to flow from the second outlet port. Preferably a pipe connected to the first outlet port leads to a liquid processor or purifier and then to an appliance, while a pipe connected to the second outlet port leads directly to the same appliance.

It is an object of the invention to provide a valve structure for a liquid supply system and such valve structure is connected to an inlet pipe and a pair of outlet pipes and includes a mechanism for directing the flow selectively through the outlet pipes.

Another object of the invention is to provide a valve structure for a water supply system having a processor or purifier and in which the valve structure includes a plunger held in a first position by a metering means so that a predetermined quantity of water flows to the processor after which the plunger is automatically shifted to direct the flow of water through a bypass pipe.

DESCRIPTION OF THE PREFERRED EMBODIMENT

Figure 1:
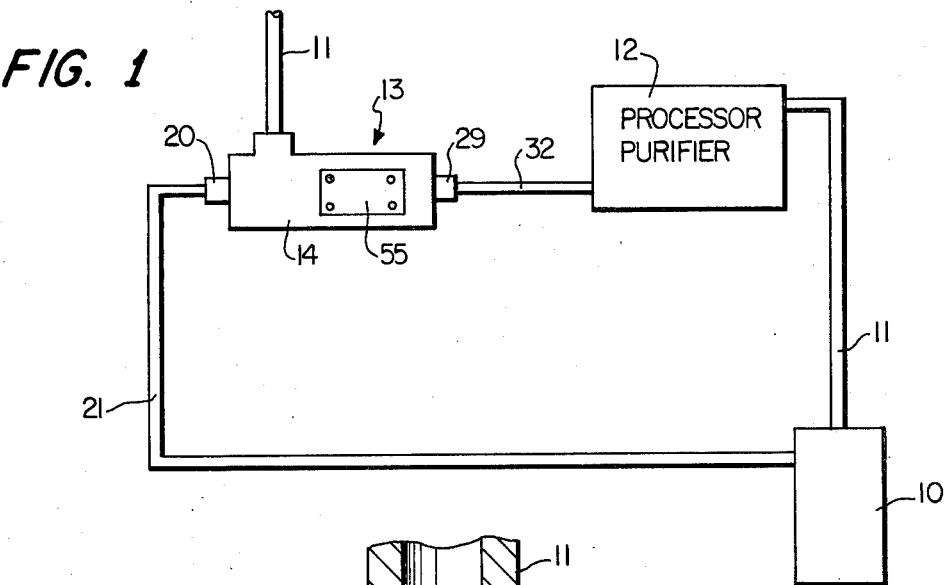
FIG. 1 is a diagrammatic view illustrating the valve structure of the present invention in a water supply system.

With continued reference to the drawings, an appliance 10 such as a coffee maker or the like is connected to a supply of water by an inlet pipe 11 in such a manner that the flow of water may be either continuous or intermittent. The appliance may have a conventional demand mechanism to control the flow of water through the inlet pipe and may include one or more heaters which raise the temperature of the water within the appliance. In many instances it is desirable to interpose a water processor or purifier 12 in the inlet pipe so that bacteria and other impurities which pass through a water purification plant are removed from the water before the water enters the appliance. Normally the processor or purifier 12 is provided with submicron filters, charcoal beds and the like which remove the impurities; however, the filters of the processor or purifier tend to become clogged with impurities after a period of time so that the quantity and pressure of water passing through the processor or purifier are substantially reduced. The processor or purifier ordinarily includes a signal to indicate insufficient water flow, however, if the system is not immediately shut down to replace the filters, damage may occur to the appliance, particularly if the heater coils of the appliance are energized when insufficient water is located therein.

In order to make certain that sufficient water is available to the appliance 10 at all times, a shutoff and bypass valve 13 is provided and such valve includes a body 14 having a threaded inlet port 15 which threadedly receives one end of a section of the inlet pipe 11. Within the body 14 the inlet port 15 communicates with a bore 16 which directs water or other liquid from the inlet pipe to a distribution chamber 17. One end of the distribution chamber 17 is provided with internal threads 18 which receive the external threads 19 of a fitting 20 and such fitting is connected in a conventional manner to a bypass pipe 21 which leads to the water inlet section of the appliance 10. The fitting 20 includes a bore 22 and a counterbore 23 separated by a shoulder 24 for a purpose which will be described hereinafter.

The opposite end of the distribution chamber 17 includes a wall 25 having an axial opening 26 extending therethrough and providing communication between the distribution chamber 17 and a metering chamber 27. As illustrated best in FIGS. 2 and 3, the body 14 is provided with an opening 28 which communicates with an enlargement 29 having an axial opening with internal threads 30 which threadedly receive the external threads 31 of a pipe 32. Such pipe 32 leads to the processor or purifier 12 and functions as a water inlet thereto.

Normally water from a source of supply enters the valve body 14 through the inlet pipe and passes through the distribution chamber 17 and the opening 26 into the metering chamber and then flows through the opening 28 and the pipe 32 to the processor or purifier 12. The water continues to flow through the processor 12 to the appliance 10 until the filter media within the processor has become clogged and substantially reaches the point where insufficient water flows through the processor to feed the appliance. At this time the flow of water to the processor is interrupted and such flow is diverted through the bypass pipe 21 to the appliance to insure that sufficient water is available to the appliance to prevent damage thereto.

Figure 2:
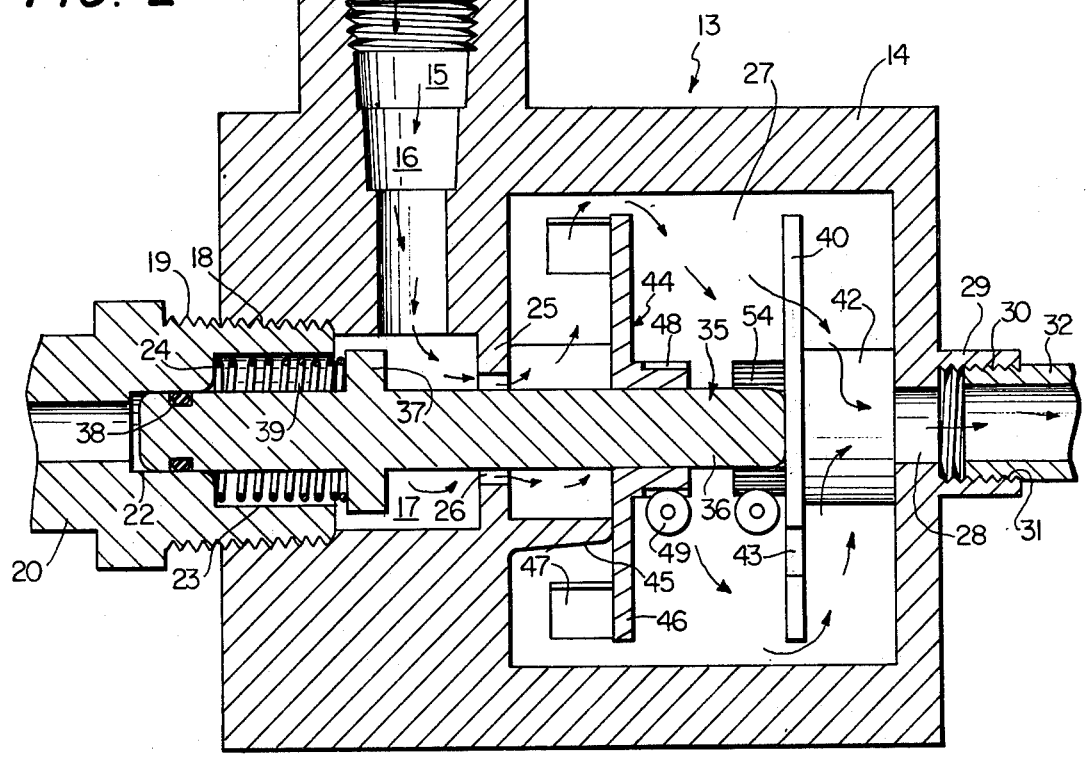
FIG. 2 is a cross-sectional view through the valve structure illustrating the plunger in a first position.
Figure 3:
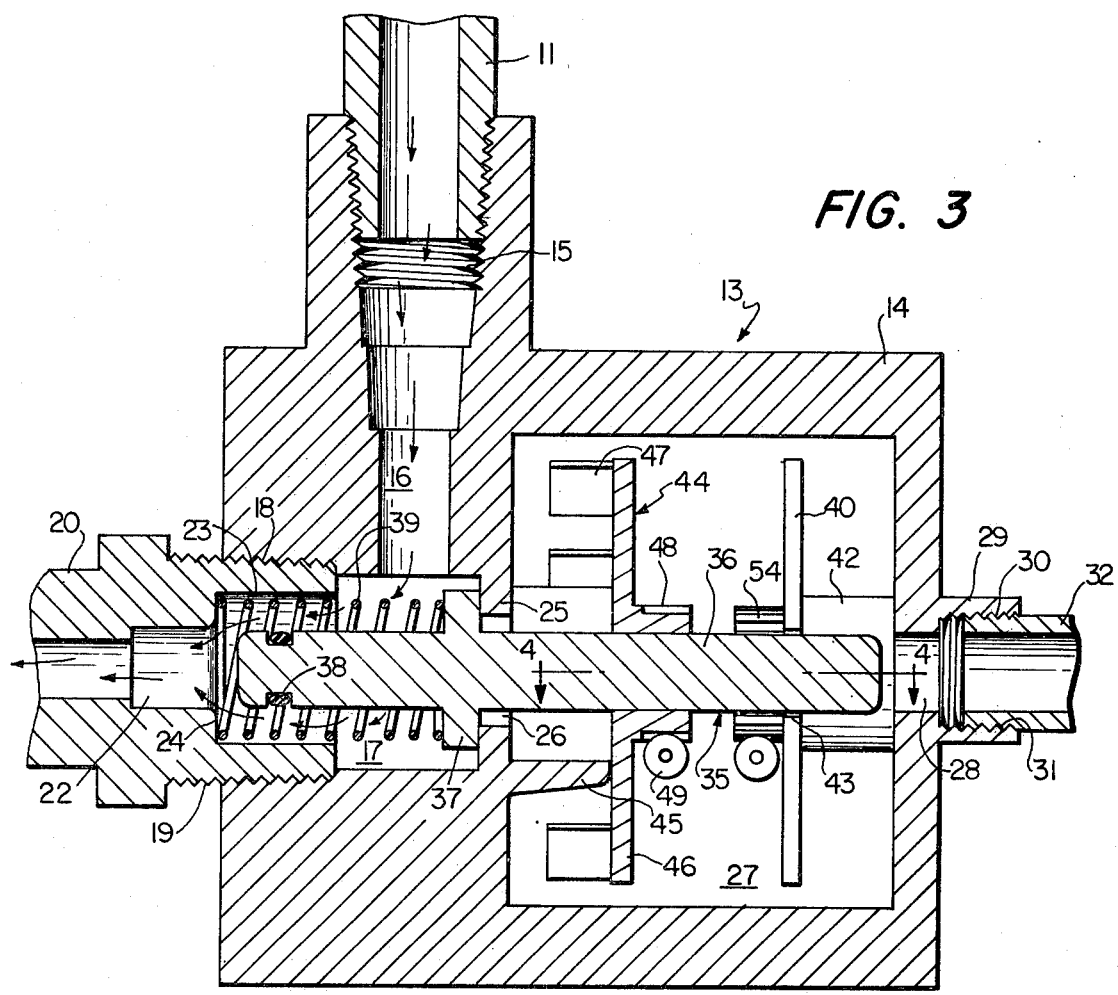
FIG. 3 is a cross-sectional view similar to FIG. 2 showing the plunger in a second position.
Figure 4:
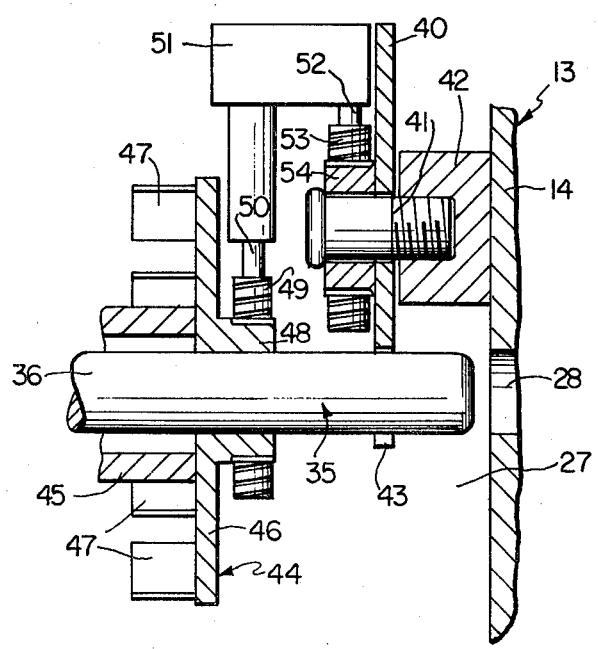
FIG. 4 is a fragmentary section taken on the line 4—4 of FIG. 3.

In order to divert the flow of water, a plunger 35 is located within the body 14 and such plunger includes an elongated generally cylindrical rod 36 having an enlarged flange or valve 37 intermediate its ends. The valve 37 is located within the distribution chamber 17 and one end of the rod 36 extends into the fitting 20 while the opposite end of such rod extends through the opening 26 into the metering chamber 27. The first end of the rod 36 which extends into the fitting 20 is provided with an O-ring seal 38 for engaging the bore 22 of the fitting when the plunger 35 is moved to the left, as illustrated in FIG. 2. In this position a compression spring 39, which is located within the counterbore 23 of the fitting, bears against the shoulder 24 and one side of the valve 37 and such spring normally urges the plunger 35 to the right with reference to FIGS. 2 and 3.

Within the metering chamber 27 a disk 40 is rotatably mounted by a pivot pin 41 to a boss or enlargement 42 carried by the body 14. The axis of the pivot pin 41 is laterally offset from the axis of the plunger 35 and is generally parallel therewith. The disk 40 has a radial slot or opening 43 of a size slightly larger than the diameter of the rod 36 and when the disk 40 is rotated the slot or opening 43 is moved into axial alignment with such rod so that the end portion of the rod may pass therethrough.

In order to rotate the disk 40, a turbine wheel, nutating disk, or pelton wheel 44 is located within the metering chamber 27 and is freely rotatably mounted on the rod 36. As illustrated best in FIGS. 2 and 3, a hollow enlargement 45 extends from the wall 25 into the metering chamber 27 and such enlargement has an interior opening generally concentric with the opening 26 in the wall 25. Such enlargement is generally C-shaped in cross-section to provide an opening or mouth through which water or other liquid from the distribution chamber 17 is directed. The turbine wheel 44 includes an imperforate disk 46 which closes the open end of the enlargement 45 and such disk is provided with a plurality of curved fins 47 adjacent to the periphery thereof. The water passing through the enlargement 45 flows through the opening therein generally radially of the disk 46 and through the fins 47 which are located in the flow path so that the flowing water impinges on the fins and causes the disk 46 to rotate.

A gear 48 is fixed to the disk 46 on the side opposite the fins 47 and such gear is generally concentric with the rod 36. A worm 49 which is fixed to a shaft 50 meshes with the gear 48 and is rotated thereby when the disk 46 is rotated. The shaft 50 extends into a gear box 51 having any desired reduction gearing therein and such gear box has an output shaft 52 which is driven by the reduction gearing. A worm 53 is fixed to the shaft 52 and such worm meshes with a gear 54 carried by the disk 40 to cause such disk to rotate slowly when water or other liquid is flowing through the metering chamber 27.

It is contemplated that a conventional nutating disk, pelton wheel or other structure which is influenced by or caused to rotate by the flow of water or other liquid past the same could be used instead of the illustrated turbine wheel 44. Also it is contemplated that the disk 40 could be driven by a conventional timing mechanism (not shown) particularly when the flow of liquid through the purifier to the appliance is substantially continuous.

In the operation of the device, the slot or opening 43 of the disk 40 normally is out of axial alignment with the rod 36 so that the end of the rod slidably engages one face of the disk 40. In this position the spring 39 is compressed and the O-ring seal 38 engages the bore 22 so that substantially all of the water from the inlet pipe 11 passes through the distribution chamber 17 and the metering chamber 27 to the processor or purifier 12 and then to the appliance 10. The passage of water through the metering chamber causes the turbine disk 46 to rotate which in turn drives the gearing within the gear box 51 and such gearing drives the disk 40 at a greatly reduced rpm. When a predetermined quantity of water has passed through the metering chamber 27, the radial slot or opening 43 moves into axial alignment with the rod 36 at which time the energy stored in the spring 39 pushes the plunger to the right, as illustrated best in FIG. 3 so that the rod 36 enters the slot 43. In this position the valve 37 engages the wall 25 and substantially prevents the passage of water through the opening 26 into the metering chamber. Simultaneously the movement of the plunger causes the O-ring seal 38 to move out of the bore 22 so that water from the distribution chamber 17 flows through the fitting 20 and the bypass pipe 21 to the appliance 10.

If desired, the processor or purifier may energize a signal to warn the operator that water passing through the appliance 10 is not passing through the purifier but instead is flowing directly from the source to the appliance. When this occurs, the operator replaces the filter media within the processor or purifier and since no water is flowing through the processor or purifier at the time it is not necessary to interrupt the flow of water to the appliance. After the filter media has been reconditioned or replaced, the plunger 35 is recocked and the disk 40 is rotated slightly so that the rod 36 can no longer pass through the radial slot 43. The recocking of the plunger 35 may be accomplished in any desired manner such as opening a door 55 in the valve body and physically resetting the system or an appropriate disengaging mechanism may be installed in the gear train and a resetting key may be provided for retracting the plunger.

We claim:

1. A valve apparatus for use in a liquid supply system, comprising a body having wall structure defining a hollow distribution chamber and a hollow metering chamber, said wall structure having an opening providing communication between said distribution chamber and said metering chamber, said distribution chamber communicating with an inlet port, a first outlet port located in the wall structure of said metering chamber and a second outlet port located in the wall structure of said distribution chamber, plunger means movably mounted within said distribution chamber and said metering chamber, said plunger means including valve means for selectively interrupting communication between said distribution chamber and said metering chamber, seal means on said plunger means for closing said second outlet port when said distribution chamber communicates with said metering chamber, metering means located within said metering chamber, said metering means retaining said plunger means in a first position permitting communication between said distribution chamber and said metering chamber until a predetermined quantity of liquid passes through said metering chamber and thereafter permitting said plunger means to move to a second position in which said valve means interrupts communication between said distribution chamber and said metering chamber and opens communication between said distribution chamber and said second outlet port.

2. The structure of claim 1 including resilient means normally urging said plunger means toward said second position.

3. The structure of claim 1 in which said metering means includes a rotatable disk having an opening of a size to receive said plunger means, the opening of said disk normally being out of axial alignment with said plunger means, and means for rotating said disk.

4. The structure of claim 3 in which said means for rotating said disk includes wheel means rotatably mounted on said plunger means, and gear means connecting said wheel means to said disk.

5. The structure of claim 1 in which said seal means on said plunger means for closing said second outlet port includes an O-ring seal engageable with said second outlet port.

6. A shutoff and bypass valve apparatus for use in a water supply system having a water purifier means and an appliance which uses water, comprising a body having wall structure defining a hollow distribution chamber and a separate metering chamber, an opening normally providing communication between said distribution chamber and said metering chamber, said distribution chamber communicating with an inlet port which is connected to a supply of water by a first pipe means, a first outlet port located in the wall structure of said metering chamber and a second outlet port located in the wall structure of said distribution chamber, second pipe means connecting said first outlet port to said purifier means and said appliance, third pipe means connecting said second outlet port of said appliance, plunger means extending through said opening and having a first portion located within said distribution chamber and a second portion located within said metering chamber, said first portion of said plunger means including a first seal means for closing said second outlet port when said plunger means is in a first position and opening said second outlet port when said plunger means is in a second position, said first portion of said plunger means including a second seal means for permitting water to flow from said distribution chamber to said metering chamber when said plunger means is in said first position and interrupting the flow of water when said plunger means is in said second position, metering means located within said metering chamber for metering the flow of water therethrough, said metering means normally maintaining said plunger means in said first position until a predetermined quantity of water has passed through said metering chamber and then permitting said plunger means to move to said second position, and resilient means urging said plunger means toward said second position, whereby a predetermined quantity of water flows from said first pipe means through said distribution chamber and said metering chamber and is discharged through said second pipe means and said purifier means to said appliance and thereafter, when said plunger means moves to said second position, the water flows from said distribution chamber through said third pipe means to said appliance.

* * * * *